Sept. 28, 1965      H. D. HOLMES      3,208,493
LOCKNUT AND STUD DEVICE
Filed Feb. 13, 1961      2 Sheets-Sheet 1
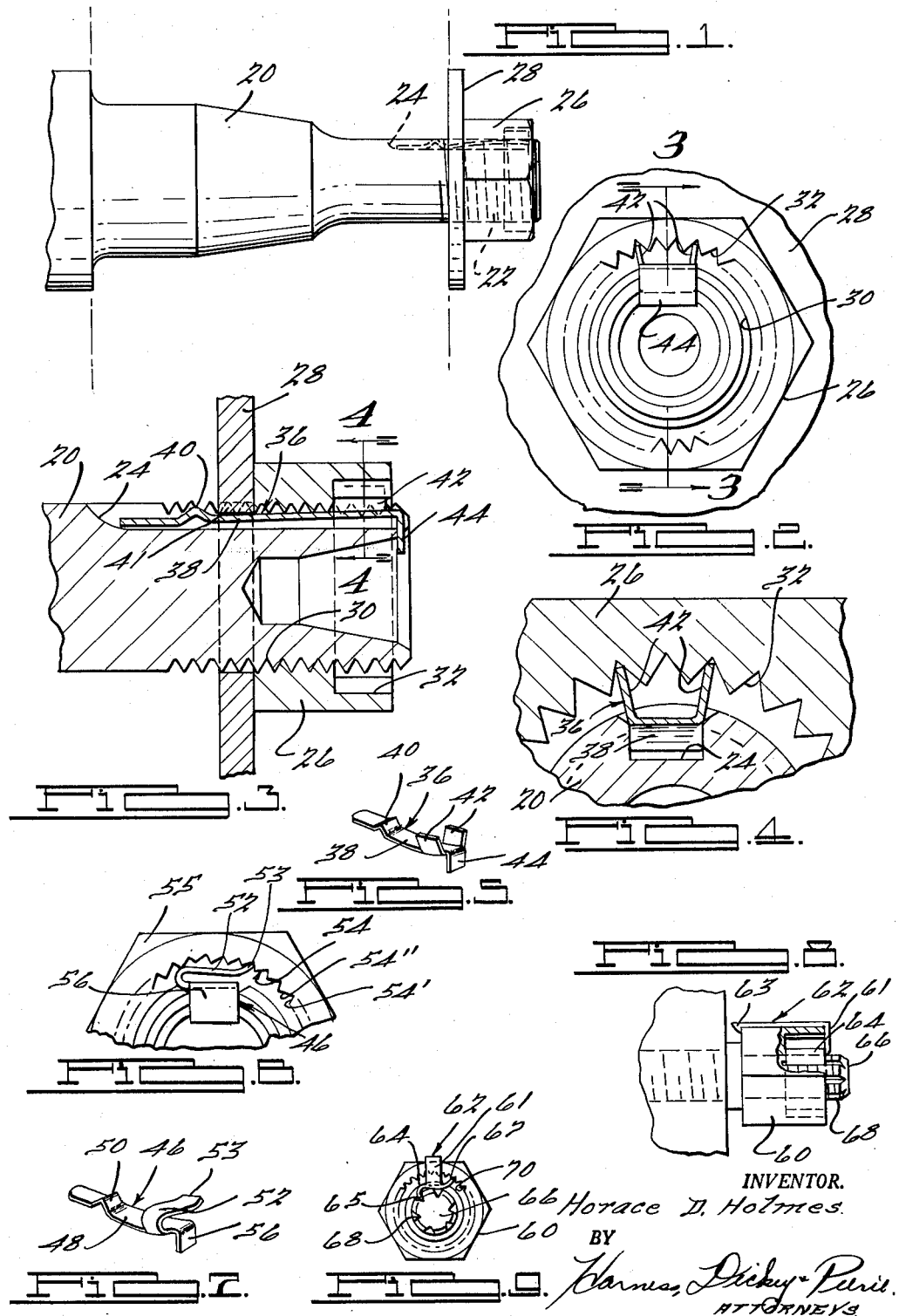
INVENTOR.
Horace D. Holmes.
BY
Harness, Dickey & Pierce
ATTORNEYS

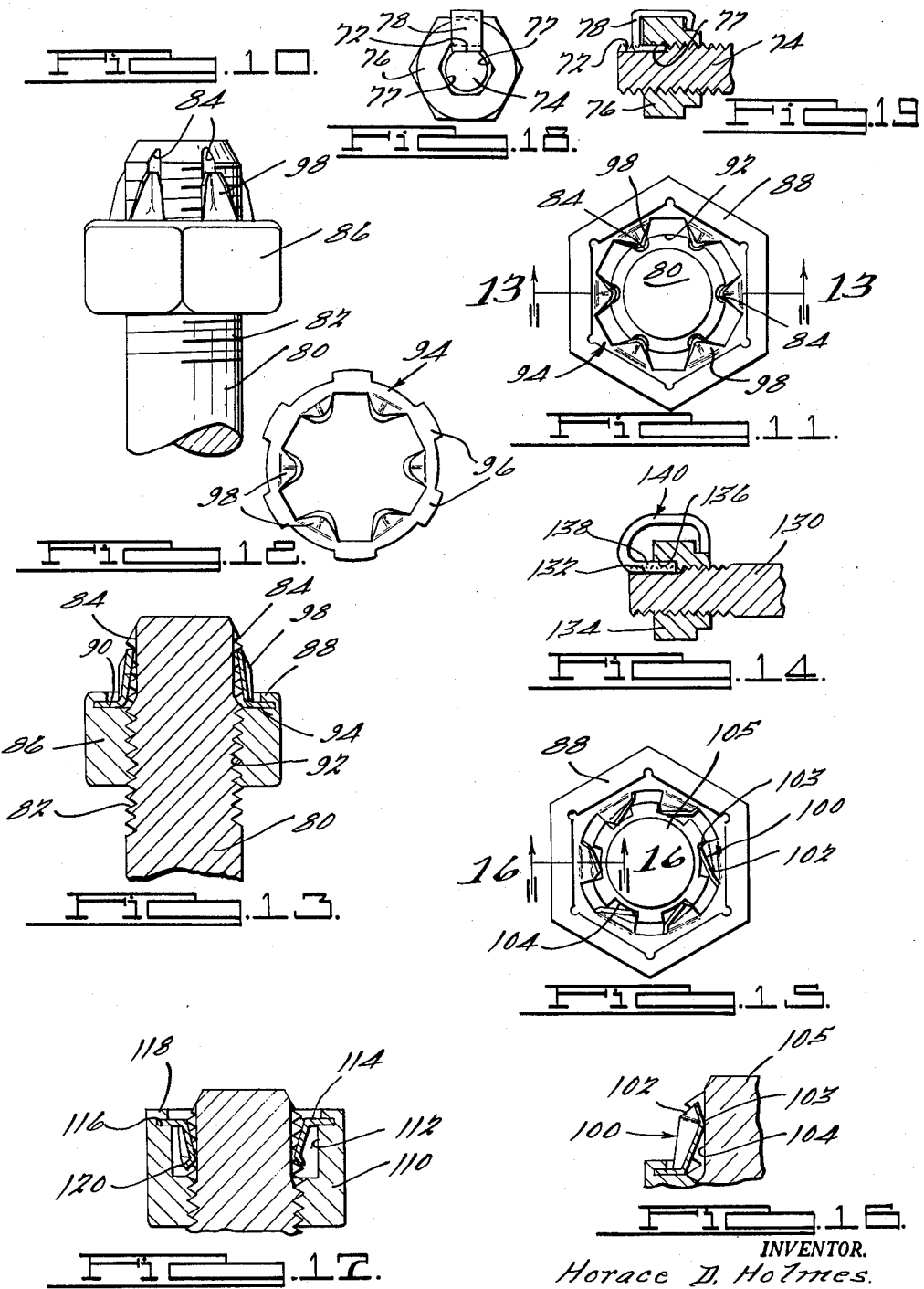

United States Patent Office 3,208,493
Patented Sept. 28, 1965

3,208,493
LOCKNUT AND STUD DEVICE
Horace D. Holmes, 560 Haverhill Road,
Bloomfield Hills, Mich.
Filed Feb. 13, 1961, Ser. No. 88,866
2 Claims. (Cl. 151—8)

This invention relates to an improved locknut and stud combination and to an improved locknut construction.

Many locknuts of various types have been developed in the past. However, many such nuts either do not positively retain the nut on the stud or are expensive to manufacture and produce.

It is, therefore, an object of this invention to provide an improved locknut and stud combination wherein the nut may be easily threaded onto the stud and wherein the nut will be positively retained in a predetermined threaded position on the stud and in which the locknut and stud are exceptionally inexpensive to manufacture.

It is a still further object of this invention to provide an improved locknut and stud combination of the aforementioned type in which the nut can be freely positioned with respect to the stud and then positively retained in a large number of adjusted positions on the stud.

It is a still further object of the invention to fix a locknut and a stud combination of the aforementioned type in any one of a number of relative positions by spring-loading a member between the nut and the stud.

It is a still further object of this invention to provide a locknut and stud combination of the aforementioned type in which a resilient finger is carried on the nut which engages a slot in the stud so as to retain the nut in an adjusted position relative to the stud.

It is a still further object of this invention to provide a locknut and stud combination of the aforementioned type in which the finger may be constructed so as to positively retain the nut against backing off rotation on the stud unless the finger is broken or otherwise removed or in which the finger may be constructed so that it will retain the nut in an adjusted position on the stud against vibrations, shock or other operational forces but can be manually sprung out of the way to permit the nut to be backed off of the stud.

It is a still further object of this invention to provide a locknut and stud combination of the aforementioned type in which a plurality of resilient fingers are carried on the nut which engage a plurality of slots in the stud so as to retain the nut in a plurality of adjusted positions relative to the stud.

It is a still further object of this invention to provide an improved locknut for use in the aforesaid combination which is durable in construction and use and which is extremely inexpensive to manufacture.

Further objects, features and advantages of this invention will become apparent from a consideration of the following description, the appended claims and the accompanying drawing in which:

FIGURE 1 is a side elevational view of the combination of this invention showing one form of a locknut constructed in accordance with the invention threaded on the stud-like end of a spindle arm portion of a vehicle suspension system;

FIGURE 2 is an enlarged fragmentary end elevational view of the structure illustrated in FIGURE 1;

FIGURE 3 is a sectional view taken along the line 3—3 of FIGURE 2;

FIGURE 4 is an enlarged fragmentary sectional view taken along the line 4—4 of FIGURE 3;

FIGURE 5 is an isometric view of a retaining element portion of the combination illustrated in FIGURES 1-4;

FIGURE 6 is a fragmentary end elevational view of another locknut and stud combination constructed in accordance with certain concepts of the invention;

FIGURE 7 is an isometric view of a retaining element portion of the combination illustrated in FIGURE 6;

FIGURE 8 is a view partially in section and partially in elevation of a still further form of the this invention;

FIGURE 9 is an end elevational view of the structure illustrated in FIGURE 8;

FIGURE 10 is a side elevational view of another form of a locknut according to this invention threaded on a stud;

FIGURE 11 is an end elevatonal view of the structure illustrated in FIGURE 10;

FIGURE 12 is a plan view of a retaining element portion of the locknut illustrated in FIGURES 10 and 11;

FIGURE 13 is a sectional view of the structure illustrated in FIGURE 11 taken along the line 13—13 thereof;

FIGURE 14 is a view partially in section and partially in elevation of a still further form of the invention;

FIGURE 15 is an end elevational view of still a further form of this invention;

FIGURE 16 is a fragmentary section of the structure illustrated in FIGURE 15 taken along the line 16—16 thereof;

FIGURE 17 is a vertical sectional view of yet another form of this invention;

FIGURE 18 is a view partially in section and partially in elevation of a still further form of the invention; and FIGURE 19 is an end elevational view of the structure illustrated in FIGURE 18.

Referring now to FIGURES 1-5, inclusive, a spindle arm 20 of a vehicle suspension system is illustrated, one end of which is conventionally threaded at 22. The spindle 20 also is provided with an axially extending slot 24 in the outer threaded periphery thereof. The spindle 20 is forged and then machined. The slot 24 is machined in the outer end of the spindle 20 prior to the threads being formed on the periphery thereof. The illustrated spindle 20 is merely representative of any threaded stud which requires a locknut in combination therewith which will be positively retained thereon against vibration, shock and the like.

The nut 26 is illustrated as a conventional hexagonal type which axially abuts against a washer 28 of a type commonly present in such a spindle arrangement to position or load a bearing and the like. It should be noted that the external shape of nut 26 may vary without departing from the scape of the invention. A plurality of circumferentially spaced axially extending teeth or grooves 32 are cold-formed in the wall of a central aperture or axially extending annular groove portion 30 in the nut 26 when the nut blank is formed. The wall of a small diameter portion of the aperture 30 is threaded so that nut 26 can be threadably connected or disconnected from the spindle 20.

The cold-formed grooves 32 and the slot 24 in the spindle 20 cooperate with an elongated resilient spring-like retaining element generally designated 36, formed of a body member of sheet metal, wire or any other suitable material, as illustrated in FIGURE 5, in a unique manner to securely lock the stud and nut against relative rotation in a large number of predetermined adjusted positions and yet enable the nut 26 to be rotatably adjusted on the spindle by merely snapping the element 36 from between the nut 26 and the spindle 20.

In particular, the element 36 consists of an axial finger 38 having a shoulder 40 bent therein. A plurality of radially extending, generally U-shaped fingers 42 and a tab 44 are carried on the opposite end of finger 38.

When the element 36 is disposed between the nut 26 and the spindle 20 as best illustrated in FIGURE 3, the shoulder 40 is disposed radially outwardly of the inner edge of a tang portion 41 on the washer 28 which fits in slot 24 so that axial movement of the element 36 is effectively resisted unless a manual force is imposed upon the element 36 for removing it in an axial direction. The finger 38 is disposed in the slot 24 with its radial fingers 42 extending into the grooves 32 on the nut 26 to lock the nut 26 in a given adjusted position with respect to the slot 24 and the spindle 20.

The spring-like resiliency of the element 36 causes the shoulder 40 to deflect inwardly and snap free of tang 41 when a suitable tool is inserted between the end of the spindle 20 and the tab 44 and pulled outwardly.

It should be noted that there are a large number of grooves 32 provided in the nut 26. The element 36 will, therefore, fit between the spindle 20 and the nut 26 to maintain a locking action therebetween in a large number of adjusted positions of the nut 26 with respect to the spindle 20. Furthermore, it should be noted that once the element 36 is inserted into the slot 24 the nut will be locked on the spindle 20 against rotation which would back the nut 26 off the spindle 20 or rotation which would thread the nut 26 onto the spindle 20.

A modification of the arrangement in FIGURES 1–5 is illustrated in FIGURES 6 and 7 wherein an element 46, which is the counterpart of the element 36 in the first embodiment, has an axial finger 48 having a shoulder 50 formed therein which fits in a slot similar to slot 24 in the first embodiment. A washer tang (not illustrated) retains the element 46 therein in the same manner as element 36 is retained in the first embodiment.

A finger portion 52 depends substantially perpendicular to the top surface of the axial finger 48 to a point away from the surface where it extends laterally thereacross. A free end portion 53 of the finger 52 extends in a substantially radial direction to engage grooves 54 in a nut 55. The grooves 54 each have a leading edge 54' extending substantially in a radial direction and a trailing edge 54" which is substantially perpendicular to edge 54'. A tab 56 is the counterpart of the tab 44 in the first embodiment.

In this arrangement the radial end portion 53 engages the leading edge 54' to prevent rotation of the nut off the spindle. However, the end portion 53 is disposed to permit rotation of the nut 55 as it is threaded on the spindle. In effect, the free end 53 is cammed across the trailing edges 54" of grooves 54 as the nut is threaded in a clockwise direction onto the spindle. If an attempt is made to thread the nut in a counterclockwise direction off the spindle the free end portion 53 will engage the edge 54' to prevent such a camming action.

Still another embodiment of the invention is illustrated in FIGURES 8 and 9 and includes a resilient spring-like sheet metal retaining element 62 having end tab portions 61, 63 which fit over the outer periphery and ends of a nut 60. An S-shaped finger 64 depends from the tab portion 61 between a threaded spindle or stud 66 and the nut 60. The threaded stud 66 has one or more cold-formed grooves 68 formed in its outer threaded periphery which run in an axial direction. The nut 60 likewise has a plurality of circumferentially spaced grooves cold-formed therein which run in an axial direction. The S-shaped finger 64 has opposed radial ends 65, 67 which are adapted to extend into the slots 68 and the grooves 70, respectively, when the retaining element 62 is inserted into position between the stud 66 and the nut 60. Once the free ends 65, 67 engage slot 68 and grooves 70, respectively, relative turning movement between the stud 66 and the nut 60 is restrained. Similarly, in FIGURES 18 and 19 one or more axial flats 72 are formed in the outer periphery of a stud 74 and one end of the inner periphery of a nut 76 has a plurality of flats 77. A finger 78 similar to the finger 64 is formed from a flat strip of resilient material and acts to restrain relative turning movement between the stud 74 and the nut 76 in the same manner as the finger 64. Each finger 64, 78 is quickly and easily snapped between their respective stud and nut. The locking restraint will be maintained notwithstanding severe vibrational or shock forces acting on the unique arrangement. The spring-like retaining elements 62, 78 are quickly removed from between the nuts 60, 76 and studs 66, 74, respectively, by snapping up and pulling axially thereon.

According to other concepts of the invention, the retaining element may be connected directly to the nut and serve the same purpose as the elements 36, 46, 62 of the previous embodiments. In accordance with this aspect of the invention in FIGURES 10–13, inclusive, it will be seen that a conventional stud 80 is illustrated, one end of which is conventionally threaded at 82 with the stud 80 being provided with a plurality of circumferentially spaced, axially extending slots 84 in the outer threaded periphery thereof. In the illustrated example, six such slots are provided but obviously the number of slots can be varied. The stud 80 may preferably be formed in a cold-heading operation in which the slots 84 are formed in the stud 80 during the formation of the stud blank and prior to the threads being formed on the periphery thereof. The inexpensive production practice of the earlier embodiments is thus retained in that presently under consideration.

A nut 86 illustrated as a conventional hexagonal type is threaded on stud 80. As was the case in the earlier embodiments, its external shape may vary without departing from the scope of the invention. The top face of the nut 86 is provided with an upstanding flange 88 extending around the nut 86 adjacent the outer periphery and a seat 90 disposed axially inwardly of the flange 88. The nut, of course, is provided with a central aperture 92 which is threaded in a conventional manner so that it can be threadably connected or disconnected from the stud 80. The seat 90 is disposed between the outer periphery of the aperture 92 and the inner periphery or edge of the flange 88 which extends around the nut.

A generally ring-shaped retainer member 94 has one face resting on the nut seat 90 and has a plurality of circumferentially spaced radial finger or ear portions 96 adjacent the outer periphery thereof which engage the inner face of the nut flange 88. The retainer member 94 is also provided with a plurality of axially extending, circumferentially spaced, spring fingers or prongs 98 which extend in their undeformed form over the central aperture of the nut. The retainer member 94 is locked into engagement with the nut 86 by upsetting or staking the flange portion 88 over the outer peripheral portion and ears 96 of member 94 so as to retain it against axial movement relative to the nut 86 and it is, of course, retained against rotative movement relative to the nut 86 because the nut 86 is of a hexagonal form while the outer periphery of the retainer member 94 has its ears 96 disposed on a circle.

The spring fingers or prongs 98 of the retainer member 94 may be formed in different ways. Two such ways are illustrated in the drawings. In FIGURES 10–13, the prongs or fingers 98 are bent upwardly so as to extend in a generally V-shaped cross section and the upper or free ends of the prongs converge toward each other so that the inner ends of the circumferentially spaced, axially extending fingers or prongs 98 are disposed radially inwardly of the wall of threaded aperture 92 in the nut 86, while the lower ends of the fingers are disposed outwardly of the nut aperture 92. While the spring fingers 98 are of a generally V-shaped cross section, it will be noted that the "V" is not a sharp "V" but rather a rounded "V" so that when the nut is threaded onto the threaded end 82 of the stud 80, the spring fingers 98 will be cammed by the walls of the slots 84 out of the way so that the nut 86 can be threaded easily onto the stud, but so that engagement of each spring finger 98 with a slot 84 can be felt. When the nut has been threaded into its desired position on the stud, the rotation is stopped, and the spring fingers 98 will be in engagement with the slots 84. Depending upon the arrangement of the spring fingers 98 and the slots 84, the spring fingers 98 will be in engagement with one or more of the slots 84 notwithstanding the adjusted position of the nut with respect to the stud. In cases where locking is desired through a large number of adjusted positions the number of slots 84 and fingers 98 will be increased over the representative showing. Because of the "V" shape of the spring fingers 98, the nut 86 can be backed off from the stud 80 and the same camming action of the spring finger 98 away from the walls of the stud slots 84 will occur. However, sufficient force must be applied to the nut to cause this camming action and it is considered that vibrational or other forces will not be sufficient to permit the nut to rotate relative to the stud, but only the application of manual force with a wrench or the like can effect this backing off of the nut. Thus, it is felt that the nut will be locked on the stud against disengagement, but disengagement can nevertheless be effected by the application of a manual force without having to damage either the nut or the stud.

The embodiment of the invention illustrated in FIGURE 14 includes a stud portion 130 which has an axial groove 132 formed in its outer threaded periphery. A nut 134 threadably engages the stud 130 and has a plurality of axial grooves or recesses such as groove 136 circumferentially disposed in its threaded inner periphery. An end portion 138 of a resilient spring clip 140 which snaps on the nut 134 is inserted between the stud 130 and the nut 134 when the groove 132 is aligned with a groove 136. Since the end portion 138 is partly in the stud 130 and partly in the nut 134 these components are locked against relative rotation. The clip 140 can be quickly removed by manually unsnapping it from the nut 134 and axially pulling the end portion 138 from the grooves 132, 136. The embodiment shown in FIGURE 14 may also be used with any conventional bolt or stud without slots. Insertion of the clip 140, guided by the recess 136 in the nut, will cut a recess or slot through the threads of the bolt, permanently locking the two together. If the nut is made of harder material than the bolt, it will rethread the bolt with a chaser action upon removal of the nut. The same parts can then be reused and reassembled many times.

In the embodiment illustrated in FIGURES 15 and 16, spring fingers 100 are formed differently from their counterparts 98 in the embodiment of FIGURES 10–13 by twisting so as to provide a leading edge portion 102 on each of the fingers 100 which is disposed radially outwardly of the periphery of the aperture 92 in the nut 86 and an upper trailing edge portion 103 on each of the circumferentially spaced, generally axially extending fingers 100 which will bite into slots 104 on a stud 105, so that when the nut is threaded onto the stud and rotated in a clockwise direction, the leading edges 102 of the spring fingers 100 will pass over the threaded portion of the stud 105 and the trailing edges 103 will be cammed over the walls of the slots 104.

If any attempt is made to rotate the nut in a counterclockwise direction on the stud so as to back the nut off the stud, the trailing edges 103 of the spring fingers 100, which are disposed radially inwardly of the threaded periphery of the nut aperture 92, will abut and engage the edge or the wall of the slots 104 and thus prevent any reverse rotation. Therefore, the only way the nut 86 can be backed off is to either break the spring fingers 100 or insert a tool between the spring fingers 100 and the stud 105 so as to spring or pry the fingers 100 out of engagement with the walls of the slots 104. Again it will be noted that a plurality of circumferentially spaced spring fingers are provided as well as a plurality of slots, permitting the nut 86 to be positively locked in any one of a very large number of adjusted angular positions relative to the stud 105. Spring fingers 100 may be staked behind any tapped hole with the same action ensuing whenever any stud similar to 105 is inserted.

A still further modification of the invention illustrated in FIGURE 17 where a nut 110 is provided with an axial bore 112 in which a spring retainer element 114 is disposed. The retainer element 114 has one face resting on a nut seat 116 and the nut has a flange 118 that is upset or staked over the element 114 to retain it against axial movement. Fingers 120 on the element 114 are arranged with respect to slots in a stud as in the case of the modifications of FIGURES 10–13 and FIGURES 15, 16 and may be of the configuration illustrated in FIGURES 10–13 or that illustrated in FIGURES 15 and 16. The fingers 120, however, do not extend externally of nut 110 but rather are disposed within bore 112 and, therefore, are less susceptible to being broken off.

It should be appreciated that other shapes could be imparted to the spring fingers 98, 100 and 140 to serve the purpose as set forth above without necessarily departing from the scope of this invention.

It will be appreciated that a relatively inexpensive nut is provided, as well as an inexpensive stud so that the locknut and stud combination of this invention is inexpensive while nevertheless giving positive locking characteristics in a large number of angular positions.

It will be understood that the specific constructions of the improved locknut and stud combination which are herein disclosed and described are presented for purposes of explanation and illustration and are not intended to indicate limits of the invention, the scope of which is defined by the following claims.

What is claimed is:

1. A fastener assembly comprising; a nut member having an inner radial threaded surface, and a shaft member having an outer radial threaded surface, said surfaces threadedly engaged, said shaft member having an axially extending slot formed on its corresponding threaded surface from the axial outer end of said shaft member to a point axially inwardly of said nut member, a washer surrounding said shaft adjacent the axially inner end of said nut member, said washer having a tang projecting into said slot, said nut member having an axially extending annular groove portion adjacent an axial outer end thereof and coaxially radially spaced from the threaded surface of said shaft member, said groove portion having a circumferential continuous array of longitudinally extending teeth formed thereon and positioned facing radially inwardly toward said shaft member, an elongated resilient member having a flat axial body portion slidably received and supported in said slot, and a tab portion formed on said body portion at the axial outer end thereof extending toward the shaft axis and engaging the axial outer end of said shaft for positioning said resilient member in said slot, said resilient member having a pair of circumferentially spaced fingers extending generally from the side edges of said body portion and axially slidably received in and engaging said teeth for locking said nut member and said shaft member against relative rotation, said fingers being disposed in diverging relationship, the distance between said fingers being greater than the width of said slot whereby at least the axially outer part of said body portion is spaced from the bottom of said slot, and said body portion being bent to form shoulder means on an axial inner portion of said resilient member, said shoulder means engaging an axial inner portion of said washer tang to lock said resilient member in said teeth engaging position.

2. A fastener assembly comprising; a nut member having an inner radial threaded surface, and a shaft member having an outer radial threaded surface, said surfaces threadedly engaged, said shaft member having an axially extending slot formed on its corresponding threaded surface from the axial outer end of said shaft member to a point axially inwardly of said nut member, a washer surrounding said shaft adjacent the axially inner end of said nut member, said nut member having an axially extending annular groove portion adjacent an axial outer end thereof and coaxially radially spaced from the threaded surface of said shaft member, said groove portion having a circumferential continuous array of longitudinally extending teeth formed thereon and positioned facing radially inwardly toward said shaft member, an elongated resilient member having a flat axial body portion slidably received and supported in said slot, and a tab portion formed on said body portion at the axial outer end thereof extending toward the shaft axis and engaging the axial outer end of said shaft for positioning said resilient member in said slot, said resilient member having a pair of circumferentially spaced, generally U-shaped fingers extending from said body portion and axially slidably received in and engaging said teeth for locking said nut member and said shaft member against relative rotation, said fingers being disposed in diverging relationship, the distance between said fingers being greater than the width of said slot whereby at least the axially outer part of said body portion is spaced from the bottom of said slot, and said body portion being bent to form shoulder means on an axial inner portion of said resilient member, said shoulder means engaging an axial inner portion of said washer to lock said resilient member in said teeth engaging position.

References Cited by the Examiner

UNITED STATES PATENTS

| 673,832 | 5/01 | Eason | 151—9 |
| 687,774 | 12/01 | Oliver | 151—9 |
| 961,819 | 6/10 | Swenson | 151—8 |
| 1,157,230 | 10/15 | Klettke | 151—9 |
| 2,564,550 | 8/51 | Tichenor | 151—8 |

FOREIGN PATENTS

| 593,960 | 6/25 | France. |

EDWARD C. ALLEN, *Primary Examiner.*

CARL W. TOMLIN, *Examiner.*